(12) United States Patent
Chen et al.

(10) Patent No.: US 10,329,376 B2
(45) Date of Patent: Jun. 25, 2019

(54) AMPHOTERIC SHAPE-MEMORY POLYURETHANE AND METHOD FOR PREPARING THE SAME

(71) Applicant: SHENZHEN UNIVERSITY, Shenzhen (CN)

(72) Inventors: Shaojun Chen, Shenzhen (CN); Yan Yang, Shenzhen (CN); Funian Mo, Shenzhen (CN); Huanhuan Ren, Shenzhen (CN); Zaochuan Ge, Shenzhen (CN)

(73) Assignee: SHENZHEN UNIVERSITY, Shenzhen, Guangdong Province (CN)

( * ) Notice: Subject to any disclaimer, the term of this patent is extended or adjusted under 35 U.S.C. 154(b) by 225 days.

(21) Appl. No.: 15/387,589

(22) Filed: Dec. 21, 2016

(65) Prior Publication Data

US 2017/0096520 A1  Apr. 6, 2017

Related U.S. Application Data (63) Continuation-in-part of application No. PCT/CN2015/078027, filed on Apr. 30, 2015.

(30) Foreign Application Priority Data

Dec. 2, 2014 (CN) .......................... 2014 1 0720521

(51) Int. Cl.
| | | |
|---|---|---|
| C08G 18/87 | (2006.01) |
| C08G 18/75 | (2006.01) |
| C08G 18/76 | (2006.01) |
| C08G 18/24 | (2006.01) |
| C08G 18/73 | (2006.01) |
| C08G 18/32 | (2006.01) |
| C08G 18/80 | (2006.01) |
| C08G 18/08 | (2006.01) |
| C08G 18/28 | (2006.01) |

(52) U.S. Cl.
CPC ......... *C08G 18/87* (2013.01); *C08G 18/0833* (2013.01); *C08G 18/246* (2013.01); *C08G 18/288* (2013.01); *C08G 18/3206* (2013.01); *C08G 18/3275* (2013.01); *C08G 18/73* (2013.01); *C08G 18/755* (2013.01); *C08G 18/7671* (2013.01); *C08G 18/8041* (2013.01); *C08G 2280/00* (2013.01)

(58) Field of Classification Search
None
See application file for complete search history.

(56) References Cited

PUBLICATIONS

Chen et al. "Development of zwitterionic polyurethanes with multi-shape memory effects and self-healing properties" Journal of Materials Chemistry Part A, 2015, 3 (6), pp. 2924-2933; Published online Dec. 8, 2014. (Year: 2014).*

* cited by examiner

*Primary Examiner* — Christopher M Rodd
(74) *Attorney, Agent, or Firm* — Cheng-Ju Chiang (57) ABSTRACT

A method for preparing an amphoteric shape-memory polyurethane and an amphoteric shape-memory polyurethane prepared by the method, the method including: 1) polymerizing monomer A and monomer B to synthesize a polyurethane; and 2) contacting monomer D and the polyurethane to conduct a ring-opening reaction on a nitrogen group of the polyurethane, to yield an amphoteric shape-memory polyurethane. The monomer A is a N-alkyl dialkanolamine having a formula I. The monomer B is a polyisocyanate, and the monomer D is an alkyl sulfonate.

17 Claims, 9 Drawing Sheets

AMPHOTERIC SHAPE-MEMORY POLYURETHANE AND METHOD FOR PREPARING THE SAME

CROSS-REFERENCE TO RELATED APPLICATIONS

This application is a continuation-in-part of International Patent Application No. PCT/CN2015/078027 with an international filing date of Apr. 30, 2015, designating the United States, now pending, and further claims foreign priority benefits to Chinese Patent Application No. 201410720521.4 filed Dec. 2, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an amphoteric shape-memory polyurethane and a method for preparing the same.

Description of the Related Art

Shape-memory polymers (SMPs) are polymeric smart materials that have the ability to return from a deformed state (temporary shape) to their original (permanent) shape induced by an external stimulus, such as changes of temperature, force, electromagnet, and solvent.

Conventional thermally-induced shape-memory polymers possess poor biocompatibility and the shape-memory thereof leaves much to be desired. In addition, the glass transition temperature of the shape-memory polymers is often invariable, which limits the application scope of the polymers. Lastly, the preparation processes of conventional SMPs are relatively complex and costly.

SUMMARY OF THE INVENTION

In view of the above-described problems, it is one objective of the invention to provide an amphoteric shape-memory polyurethane and a method for preparing the same. The polyurethane prepared by the method has good shape-memory effect and biocompatibility.

To achieve the above objective, in accordance with one embodiment of the invention, there is provided a method for preparing an amphoteric shape-memory polyurethane. The method comprises:

1) polymerizing monomer A and monomer B to synthesize a polyurethane; and
2) contacting monomer D and the polyurethane to conduct a ring-opening reaction on a nitrogen group of the polyurethane, to synthesize an amphoteric shape-memory polyurethane.

The monomer A is the N-alkyl dialkanolamine having a formula I:

I in which, R represents $-C_nH_m$, n is an integer between 1 and 18, and $m \leq 2n+1$; and R' represents $C_xH_{2x}$, and x is an integer between 1 and 5; and the monomer B is a polyisocyanate, and the monomer D is an alkyl sulfonate.

In a class of this embodiment, in 1), following the polymerization of the monomer A and the monomer B, monomer C is added, and the monomer C is a polyhydric alcohol.

In a class of this embodiment, a dosage of the monomer A and a dosage of the monomer C satisfy the following relation: a molar ratio $q=[C]/([C]+[A])$ involving a molar number [A] of the monomer A and a molar number [C] of the monomer C is between 0 and 0.5. The dosage of the monomer A, a dosage of the monomer B, and the dosage of the monomer C satisfy that a molar ratio $r=[NCO]/[OH]$ involving a molar number [OH] of a hydroxyl group in the monomer A or a sum of hydroxyl groups in the monomer A and the monomer C and a molar number of [NCO] of an isocyanate group of the monomer B is between 0.95 and 1.05. A dosage of the monomer D satisfies that a molar ratio $p=[D]/[A]$ involving the molar number [A] of the monomer A and a molar number [D] of the monomer D is between 0.2 and 1.2.

In a class of this embodiment, synthesis of the polyurethane comprises: mechanically stirring the monomer A, the monomer B, an organic solvent, and dibutyl tin dilaurate as a catalyst in the presence of nitrogen gas for reaction at a temperature of between 70 and 90° C. for between 2 and 5 hrs; adding the monomer C to a resulting mixture for further reaction for between 2 and 5 hrs to yield a polyurethane prepolymer solution; and adding the organic solvent to the polyurethane prepolymer solution to adjusting a weight concentration of the polyurethane prepolymer solution to account for between 10 and 30 percent by weight of a total weight of a resulting mixed solution.

In a class of this embodiment, synthesis of the amphoteric shape-memory polyurethane comprises: mixing a polyurethane prepolymer solution, the monomer D of a calculated dosage, and the organic solvent in the presence of nitrogen gas to yield a mixed solution; controlling a weight concentration of the mixed solution to between 5 and 20 percent by weight; and sealing the mixed solution for reaction at a temperature of between 30 and 50° C. for between 8 and 24 hrs to yield a solution comprising the amphoteric shape-memory polyurethane.

In a class of this embodiment, the method further comprises: evaporating the organic solvent from the solution comprising the amphoteric shape-memory polyurethane at a temperature of between 80 and 100° C.

In a class of this embodiment, the solution comprising the amphoteric shape-memory polyurethane is dried in a blast oven and a vacuum oven at the temperature of between 80 and 100° C. respectively to evaporate the organic solvent.

In a class of this embodiment, the organic solvent is N,N-dimethylformamide, N,N-dimethylacetamide, or tetrahydrofuran. The monomer B is an aliphatic polyisocyanate acid or an aromatic polyisocyanate acid. The monomer C is a dihydric alcohol, a trihydric alcohol, or a tetrahydric alcohol.

In a class of this embodiment, the N-alkyl dialkanolamine is N-methyldiethanolamine, N-octadecyldiethanolamine, or N-methyldimethanolamine. The monomer B is hexamethylene diisocyanate, diphenylmethane diisocyanate, or isophorone diisocyanate. The monomer C is 1,4-butanediol or 1,4-ethanediol. The monomer D is 1,3-propanesultone or 1,4-butane sultone.

In accordance with one embodiment of the invention, there is provided an amphoteric shape-memory polyurethane prepared by the above method.

Advantages of the amphoteric shape-memory polyurethane and the method for preparing the same according to embodiments of the invention are summarized as follows: polyurethane is first prepared by stepwise polymerization using N-alkyl dialkanolamine as a raw material, then the sultone monomer is adopted for the ring-opening reaction on the tert-nitrogen atom to introduce the sulfonic groups to the chain of the polyurethane, so that the polyurethane contains both quaternary ammonium cations and sulfonic acid anions. Since the molecular chain contains both the quaternary ammonium cations and the sulfonic acid anions, the amphoteric shape-memory polyurethane possesses the antibacterial performance and the biocompatibility. In addition, under the ionic interaction, the cation structures and the anion structures form a stable physical crosslinking structure. By regulating the dosage of the monomers, the glass transition temperature of the amphoteric shape-memory polyurethane is more practical, so that the amphoteric shape-memory polyurethane possesses thermally induced shape-memory effect. Because of the water absorption property of the cations and the anions, the amphoteric shape-memory polyurethane also possesses moisture sensitive or water sensitive shape-memory effect.

BRIEF DESCRIPTION OF THE DRAWINGS

The invention is described hereinbelow with reference to the accompanying drawings, in which:

FIGS. 5A-5F illustrates self-healing performance of an amphoteric shape-memory polyurethane prepared in Example 3, in which.

DETAILED DESCRIPTION OF THE EMBODIMENTS

For further illustrating the invention, experiments detailing an amphoteric shape-memory polyurethane and a method for preparing the same are described below. It should be noted that the following examples are intended to describe and not to limit the invention.

Polyurethane is first prepared by stepwise polymerization using N-alkyl dialkanolamine as a raw material, and then the sultone monomer is adopted for the ring-opening reaction on the tert-nitrogen atom to introduce the sulfonic groups to the chain of the polyurethane, so that the polyurethane contains both quaternary ammonium cations and sulfonic acid anions. Since the molecular chain contains both the quaternary ammonium cations and the sulfonic acid anions, the amphoteric shape-memory polyurethane possesses the antibacterial performance and the biocompatibility. In addition, under the ionic interaction, the cation structures and the anion structures form a stable physical crosslinking structure. The dosage of the monomers is optionally regulated to make a glass transition temperature of the amphoteric shape-memory polyurethane more practical, so that the amphoteric shape-memory polyurethane possesses thermally induced shape-memory effect. Because of the water absorption property of the cations and the anions, the amphoteric shape-memory polyurethane also possesses moisture sensitive or water sensitive shape-memory effect.

Specifically, the method for preparing the amphoteric shape-memory polyurethane comprises:
1) polymerizing monomer A and monomer B to synthesize a polyurethane; and
2) contacting monomer D and the polyurethane to conduct a ring-opening reaction on a nitrogen group of the polyurethane, to synthesize an amphoteric shape-memory polyurethane.

The monomer A is the N-alkyl dialkanolamine having a formula I:

in which, R represents —$C_nH_m$ (n is an integer between 1 and 18, and m≤2n+1), and R' represents $C_xH_{2x}$ (x is an integer between 1 and 5). The N-alkyl dialkanolamine is N-methyldiethanolamine, N-octadecyldiethanolamine, or N-methyldimethanolamine.

The monomer B is a polyisocyanate, and is optionally an aliphatic polyisocyanate acid or an aromatic polyisocyanate acid, such as hexamethylene diisocyanate, diphenylmethane diisocyanate, or isophorone diisocyanate;

The monomer D is an alkyl sultone and is optionally 1,3-propanesultone or 1,4-butane sultone.

Preferably, in 1), following the polymerization of the monomer A and the monomer B, monomer C is added, and the monomer C is a polyhydric alcohol.

The monomer C is polyhydric alcohol functioned as a chain extender and is optionally a dihydric alcohol, a trihydric alcohol, or a tetrahydric alcohol, such as 1,4-butanediol or 1,4-ethanediol.

A dosage of the monomer A and a dosage of the monomer C satisfy the following relation: a molar ratio q=[C]/([C]+[A]) involving a molar number [A] of the monomer A and a molar number [C] of the monomer C is between 0 and 0.5. When the requirement involving the molar ratio of a molar number [OH] in the monomer A to the molar number of [NCO] of an isocyanate group in the monomer B is satisfied, the addition of the monomer C is not required, thus, the dosage of the monomer C is optionally 0.

The dosage of the monomer A, a dosage of the monomer B, and the dosage of the monomer C satisfy that a molar ratio r=[NCO]/[OH] involving a molar number [OH] of a hydroxyl group in the monomer A or a sum of hydroxyl groups in the monomer A and the monomer C and a molar number of [NCO] of an isocyanate group of the monomer B is between 0.95 and 1.05.

A dosage of the monomer D satisfies that a molar ratio p=[D]/[A] involving the molar number [A] of the monomer A and a molar number [D] of the monomer D is between 0.2 and 1.2.

Step 1) is specifically conducted as follows: the monomer A, the monomer B, an organic solvent, and dibutyl tin dilaurate as a catalyst are added to a three-mouth flask in the presence of nitrogen gas. The resulting mixture was mechanically stirred in an oil bath at a temperature of between 70 and 90° C. for between 2 and 5 hrs. Thereafter, the monomer C is added for further reaction for between 2 and 5 hrs to yield a polyurethane prepolymer solution. A weight concentration of the polyurethane prepolymer solution is regulated by the organic solvent to be between 10 and 30 percent by weight. The addition of the monomer C is not a necessary operation. When the molar ratio of the molar number [OH] of the hydroxyl groups of the monomer A to the molar number [NCO] of the isocyanate groups of the monomer B satisfies the requirement, the addition of the monomer C is not required. When the reaction between the monomer A and the monomer B is completed, the polyurethane prepolymer solution is obtained.

Specifically, 2) is conducted as follows: in the presence of nitrogen gas, the polyurethane prepolymer solution prepared in step 1) and the monomer D of a calculated weight are added to a single-mouth flask. A weight concentration of a mixed solution is regulated to between 5 and 20 percent by weight. The flask was sealed and magnetically stirred in an oil bath at the temperature of between 30 and 50° C. for reacting for between 8 and 24 hrs to yield the amphoteric shape-memory polyurethane. Finally, the organic solvent is evaporated in a blast oven at the temperature of between 80 and 100° C. to yield the amphoteric shape-memory polyurethane and a membrane material.

The organic solvent referred in steps 1) and 2) is optionally N, N-dimethylformamide, N, N-dimethylacetamide, or tetrahydrofuran.

The amphoteric shape-memory polyurethane prepared by the above method is also provided. The addition of the monomer can be regulated to make the amphoteric shape-memory polyurethane have proper glass transition temperature. The glass transition temperature can be regulated to be approaching the temperature of human body, which is able to greatly improve the application of the amphoteric shape-memory polyurethane in the biomedicine, medical treatment, and textile industries. In addition, the amphoteric shape-memory polyurethane also possesses antibacterial performance, biocompatibility, thermal sensitive shape-memory effect, moisture sensitive shape-memory effect, water sensitive shape-memory effect, and self-healing performance The amphoteric shape-memory polyurethane has great application potential in the energy materials and the biomedicine materials.

EXAMPLE 1

1) In the presence of nitrogen gas, 34.5 g of hexamethylene diisocyanate, 20 g of N-methyldiethanolamine, 0.02 wt. % of dibutyl tin dilaurate as a catalyst, and 200 mL of N, N-dimethylacetamide were respectively added to a three-mouth flask. A temperature was raised to 80° C. to carry out reaction for 4 hrs. The viscosity of a resulting polyurethane prepolymer solution was regulated to 10 percent by weight.

2) 0.15 g of 1,3-propane sultone was added to 30 g of the polyurethane prepolymer solution having a concentration of 10 percent by weight according to a molar ratio of 1,3-propane sultone to N-methyldiethanolamine of 0.2 (r=0.2) to conduct ring-opening reaction at 50° C. for 12 hrs in a sealed flask. A resulting mixed solution comprising polyurethane and N, N-dimethylacetamide was poured into a module, dried in the blast oven at 80° C. for 24 hrs and then in the vacuum oven at 80° C. for 24 hrs to yield a membrane material of the amphoteric shape-memory polyurethane.

Figure 1:
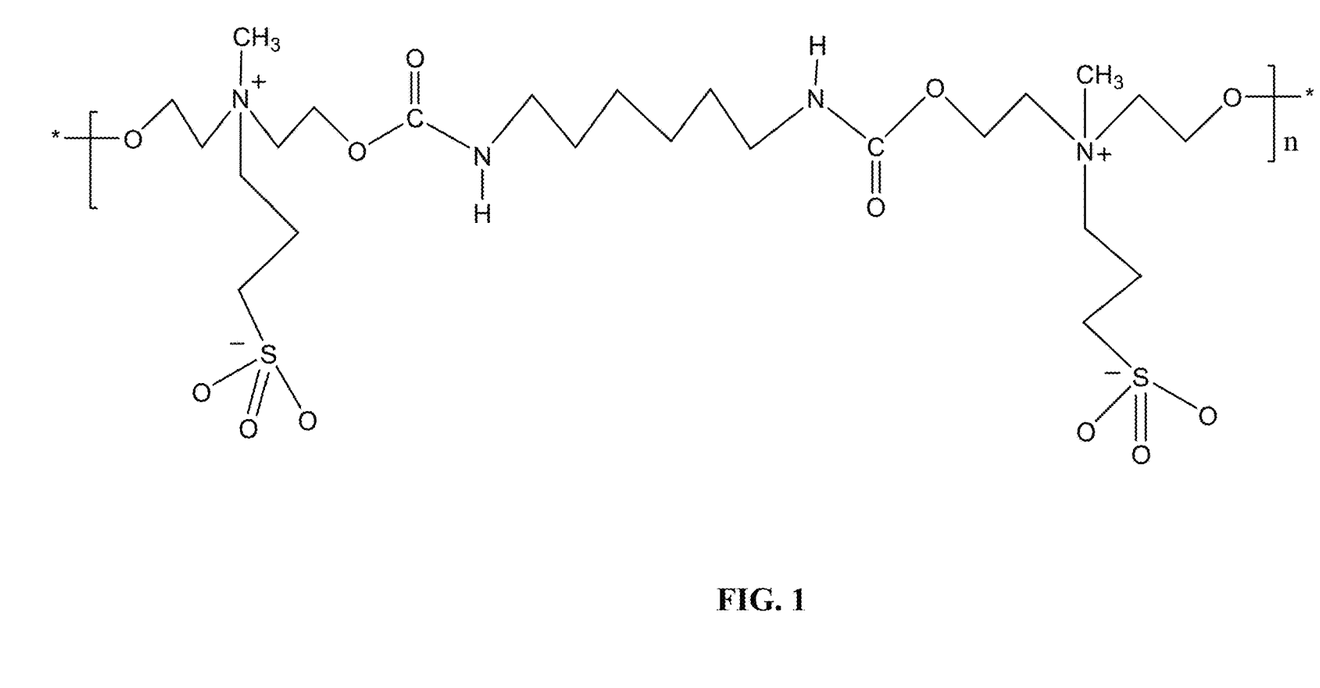
FIG. 1 is a molecular structure diagram of an amphoteric shape-memory polyurethane prepared in Example 1.

Molecular structure of the prepared amphoteric shape-memory polyurethane is shown in FIG. 1. It was indicated from the infrared spectrum that an N-H vibration peak is located at 3318 cm$^{-1}$ and a C=O vibration peak is located at 1688cm$^{-1}$, which means the successful formation of the urethane linkages. In addition, a peak of $SO_3^-$ group is detected at 1038 cm$^{-1}$, and the vibration peak of the quaternary ammonium salt is detected at 960 cm$^{-1}$, these mean that the amphoteric shape-memory polyurethane is successfully prepared. In the meanwhile, the x-ray photoelectron spectroscopy also demonstrates that the prepared amphoteric shape-memory polyurethane contains $S_{2S}$ (binding energy, 230 eV) and $S_{2p}$ (binding energy, 166 eV), which means the amphoteric shape-memory polyurethane contains sulfonic groups. Also, the $N_{1s}$ spectrum contains two kinds of binding energies, 402 eV belongs to the binding energy of the quaternary ammonium cations while the 400 eV belongs to the biding energy of the nitrogen atom of the urethane group or the non-completely reacted >N—$CH_3$. These results fully demonstrate that the amphoteric shape-memory polyurethane containing the anions and the cations is successfully prepared.

Figure 2:
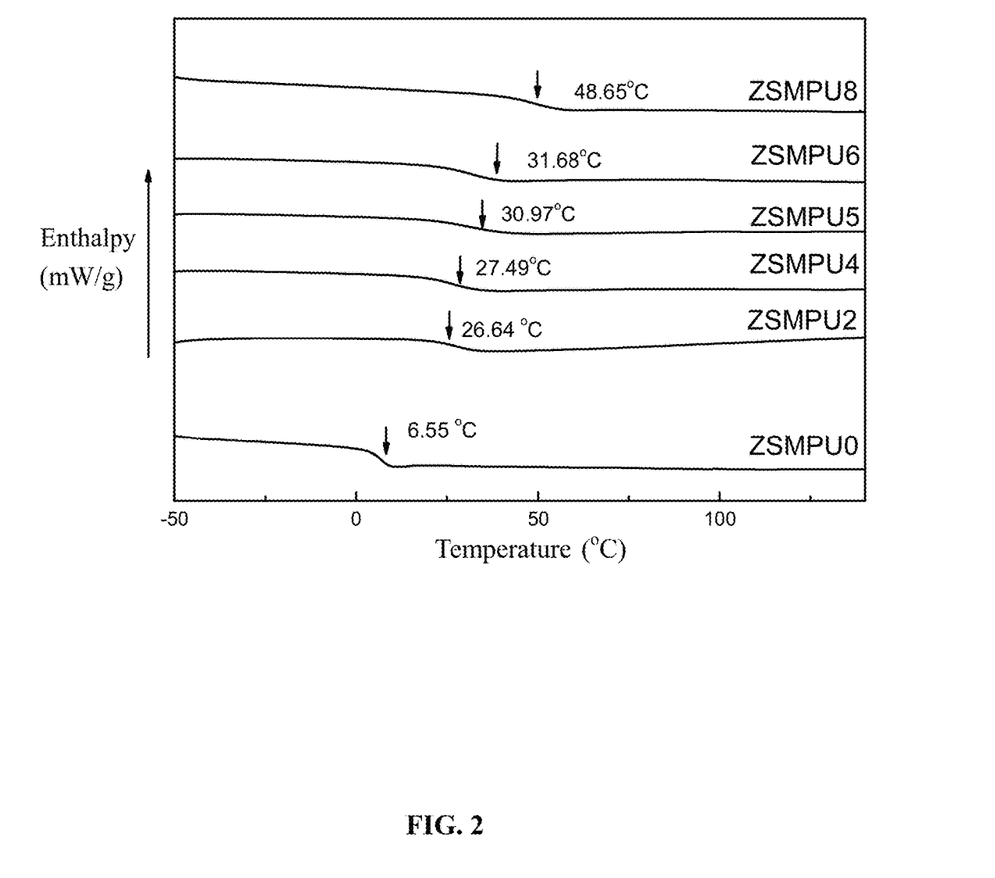
FIG. 2 is DSC curves of amphoteric shape-memory polyurethanes prepared using different dosages of 1,3-propane sultone in Example 1.

A series of the amphoteric shape-memory polyurethanes are prepared by changing the dosage of 1,3-propane sultone. 1,3-propane sultone of calculated weights were respectively added to the 30 g of the polyurethane prepolymer solution having the concentration of 10 percent by weight according to the molar ratios of 1,3-propane sultone to N-methyldimethanolamine of 0.0, 0.2, 0.4, 0.5, 0.6, and 0.8 to yield membrane materials of the amphoteric shape-memory polyurethanes. Samples were collected and labeled as ZSMPU0, ZSMPU2, ZSMPU4, ZSMPU5, ZSMPU6, and ZSMPU8. DSC curves of the amphoteric shape-memory polyurethanes prepared by different dosages of 1,3-propane sultone were charted as shown in FIG. 2, which indicates that the glass transition temperature of the polyurethane is adjustable by changing the dosage of 1,3-propane sultone. With the increment of the dosage of 1,3-propane sultone, the glass transition temperature increases.

Figure 3:
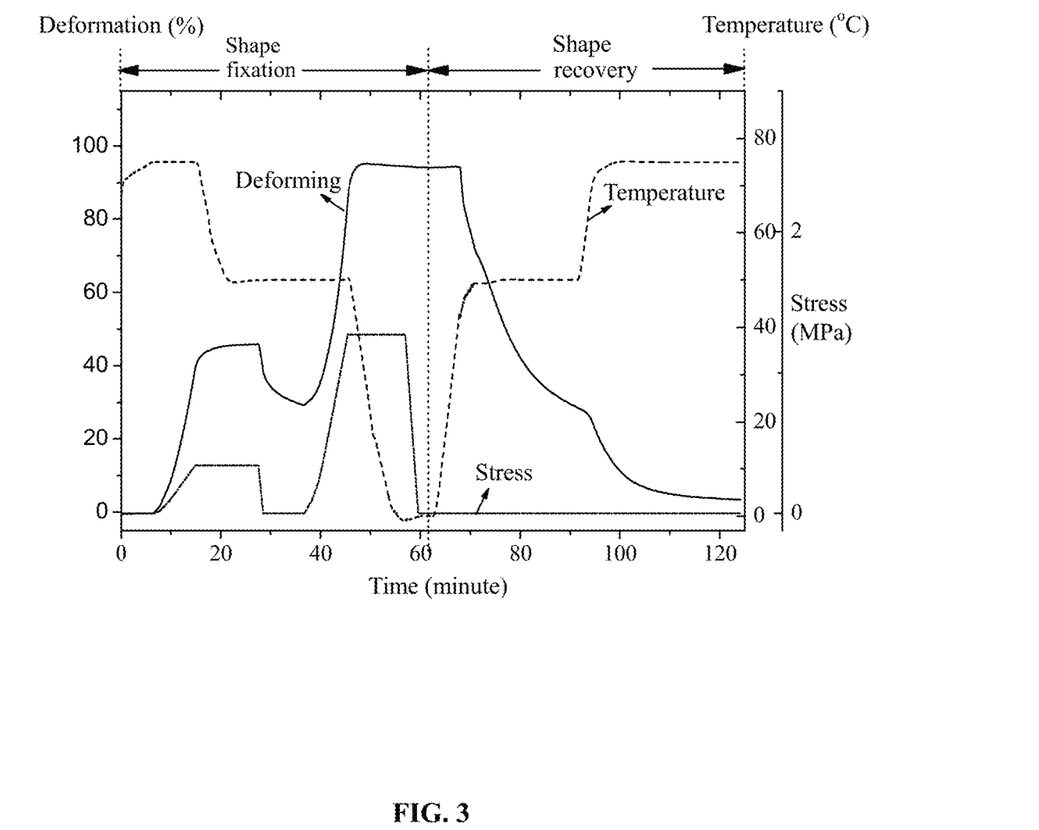
FIG. 3 is test results of triple shape-memory effect of amphoteric shape-memory polyurethane prepared in Example 1.

The prepared amphoteric shape-memory polyurethane has triple shape-memory effect. As shown in FIG. 3, when a polymer strip was stretched at 75° C. to reach a tensile deformation of 45% and fixed at 50° C. for a certain period to a fixity deformation of 28.5%, then a first temporary shape is formed and a first shape fixity rate is approximately 63.2%. When the polymer strip was stretched again at 50° C. to reach a tensile deformation of 95%, and fixed at 0° C. for a certain period to a fixity deformation of 94.2%, then a second temporary shape is formed and a second shape fixity rate is approximately 98.8%. When the temperature is raised from 0° C. to 50° C., a first shape recovery is realized, the deformation is changed from 94.2% to 28.2%, thus, a first shape recovery rate is approximately 103%. When the temperature is further raised to 75° C., the second shape recovery is realized, the deformation is further returned to 4%, thus, a second shape recover rate was 80.81%, and the integral shape recovery rate was approximately 95.8%. These results indicate that the amphoteric shape-memory polyurethane possesses relatively good triple shape-memory effect.

EXAMPLE 2

1) In the presence of nitrogen gas, 34.5 g of hexamethylene diisocyanate, 10 g of N-methyldiethanolamine, 0.02 wt. % of dibutyl tin dilaurate as a catalyst, and 200 mL of N, N-dimethylacetamide were respectively added to a three-mouth flask. A temperature was raised to 70° C. to carry out reaction for 4 hrs. Then 9 g of 1,4-butanediol was added to the three-mouth flask for further reaction for 4 hrs. The viscosity of a resulting polyurethane prepolymer solution was regulated to 10 percent by weight. 2) 0.15 g of 1,4-butane sultone was added to 30 g of the polyurethane prepolymer solution having a concentration of 10 percent by weight according to a molar ratio of 1,4-butane sultone to N-methyldiethanolamine of 0.4 (r=0.4) to conduct ring-opening reaction at 40° C. for 24 hrs in a sealed flask. A resulting mixed solution comprising polyurethane and N, N-dimethylacetamide was poured into a module, dried in the blast oven at 80° C. for 24 hrs and then in the vacuum oven at 80° C. for 24 hrs to yield a membrane material of the amphoteric shape-memory polyurethane.

It is indicated from the infrared spectrum that an N—H vibration peak is located at 3319 $cm^{-1}$ and a C=O vibration peak is located at 1695$cm^{-1}$, which means the successful formation of the urethane linkages. In addition, a peak of $SO_3^-$ group is detected at 1037 $cm^{-1}$, and the vibration peak of the quaternary ammonium salt is detected at 965 $cm^{-1}$, these mean that the amphoteric shape-memory polyurethane is successfully prepared. In the meanwhile, the x-ray photoelectron spectroscopy also demonstrates that the prepared amphoteric shape-memory polyurethane contains $S_{2S}$ (binding energy, 230 eV) and $S_{2p}$ (binding energy, 166 eV), which means the amphoteric shape-memory polyurethane contains sulfonic groups. Also, the $N_{1s}$ spectrum contains two kinds of binding energies, 402 eV belongs to the binding energy of the quaternary ammonium cations while the 400 eV belongs to the biding energy of the nitrogen atom of the urethane group or the non-completely reacted >N—$CH_3$. These results fully demonstrate that the amphoteric shape-memory polyurethane containing the anions and the cations is successfully prepared.

Figure 4:
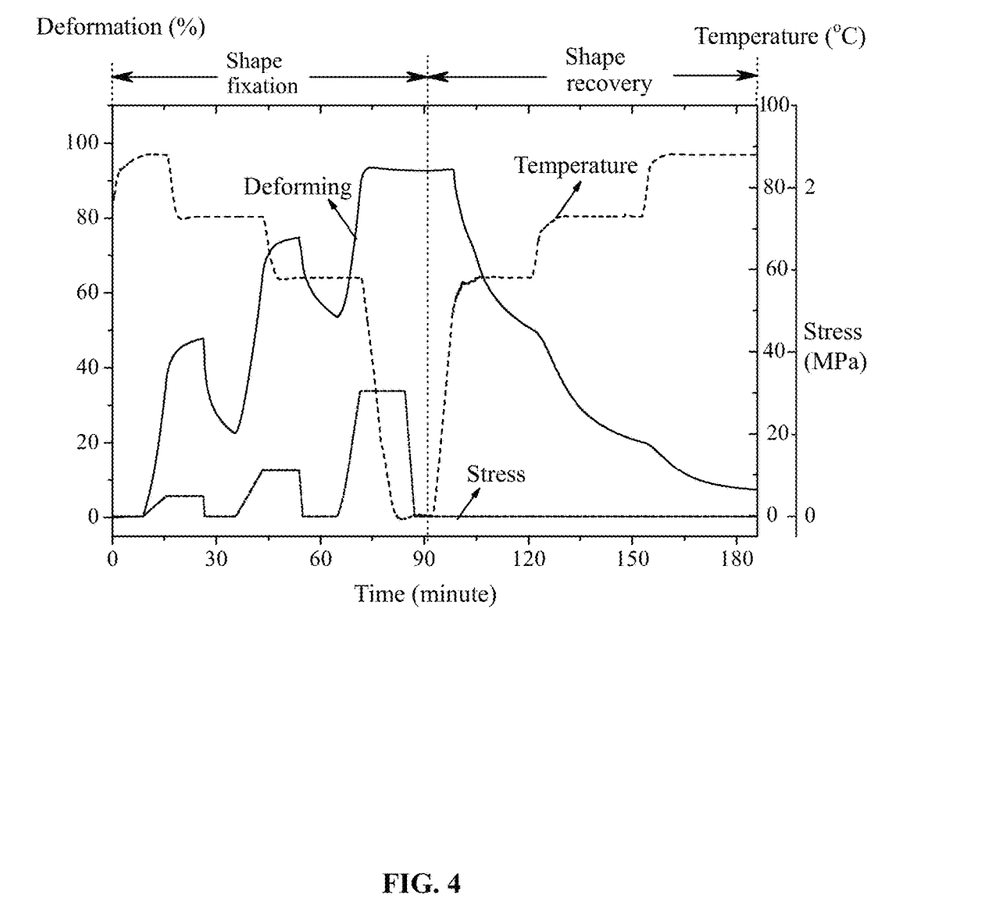
FIG. 4 is test results of quadruple shape-memory effect of amphoteric shape-memory polyurethane prepared in Example 2.

As shown in FIG. 4, the prepared amphoteric shape-memory polyurethane has quadruple shape-memory effect. When a polymer strip was stretched at 88° C. to reach a tensile deformation of 44% and fixed at 73° C. for a certain period to a fixity deformation of 20.3%, then a first temporary shape is formed. When the polymer strip was stretched again at 73° C. to reach a tensile deformation of 67%, and fixed at 58° C. for a certain period to a fixity deformation of 48.9%, then a second temporary shape is formed. When the polymer strip was further stretched at 58° C. to reach a tensile deformation of 85%, and fixed at 0° C. for a certain period to a fixity deformation of 84.2%, then a third temporary shape is formed. When the temperature is raised from 0° C. to 58° C., a first shape recovery is realized, and the deformation is changed from 84.2% to 44.8%. When the temperature is further raised to 73° C., the second shape recovery is realized, and the deformation is further returned to 18.2%. When the temperature is further raised to 88° C., the third shape recovery is realized, the deformation is further returned to 6.3%, and the integral shape recovery rate was approximately 91.60%. These results indicate that the amphoteric shape-memory polyurethane possesses relatively good quadruple shape-memory effect.

EXAMPLE 3

1) In the presence of nitrogen gas, 51.3 g of diphenylmethane diisocyanate, 30 g of N-octadecyldiethanolamine, 0.02 wt. % of dibutyl tin dilaurate as a catalyst, and 200 mL of N, N-dimethylacetamide were respectively added to a three-mouth flask. A temperature was raised to 70° C. to carry out reaction for 4 hrs. The viscosity of a resulting polyurethane prepolymer solution was regulated to 10 percent by weight. 2) 0.60 g of 1,3-propane sultone was added to 30 g of the polyurethane prepolymer solution having a concentration of 10 percent by weight according to a molar ratio of 1,3-propane sultone to N-octadecyldiethanolamine of 0.8 (r =0.8) to conduct ring-opening reaction at 50° C. for 24 hrs in a sealed flask. A resulting mixed solution comprising polyurethane and N, N-dimethylacetamide was poured into a module, dried in the blast oven at 80° C. for 24 hrs and then in the vacuum oven at 80° C. for 24 hrs to yield a membrane material of the amphoteric shape-memory polyurethane.

It is indicated from the infrared spectrum that an N—H vibration peak is located at 3316 $cm^{-1}$ and a C=O vibration peak is located at 1698 $cm^-$, which means the successful formation of the urethane linkages. In addition, a peak of $SO_3^-$ group is detected at 1035 $cm^{-1}$, and the vibration peak of the quaternary ammonium salt is detected at 966 $cm^{-1}$, these mean that the amphoteric shape-memory polyurethane is successfully prepared. In the meanwhile, the x-ray photoelectron spectroscopy also demonstrates that the prepared amphoteric shape-memory polyurethane contains $S_{2S}$ (binding energy, 230 eV) and $S_{2p}$ (binding energy, 166 eV), which means the amphoteric shape-memory polyurethane contains sulfonic groups. Also, the $N_{1s}$ spectrum contains two kinds of binding energies, 402 eV belongs to the binding energy of the quaternary ammonium cations while the 400 eV belongs to the biding energy of the nitrogen atom of the urethane group or the non-completely reacted >N—$CH_3$. These results fully demonstrate that the amphoteric shape-memory polyurethane containing the anions and the cations is successfully prepared.

Figure 5A:
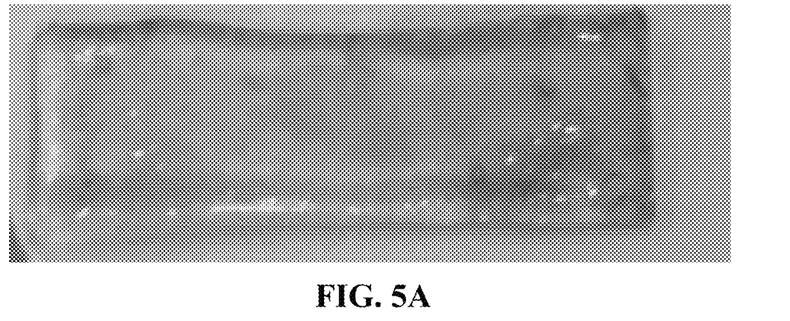
FIG. 5A shows an integral shape of an original sample.
Figure 5B:
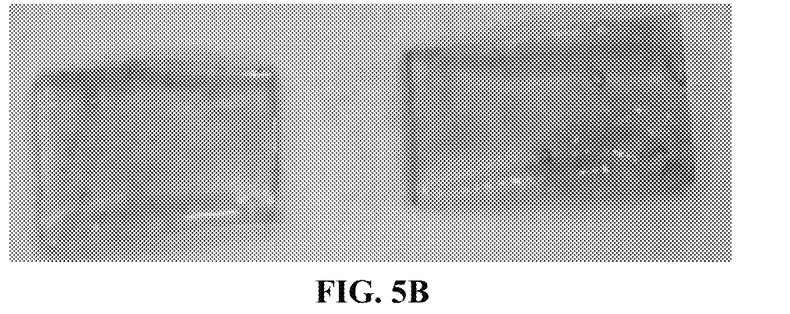
FIG. 5B shows the original sample is cut into two sections.
Figure 5C:
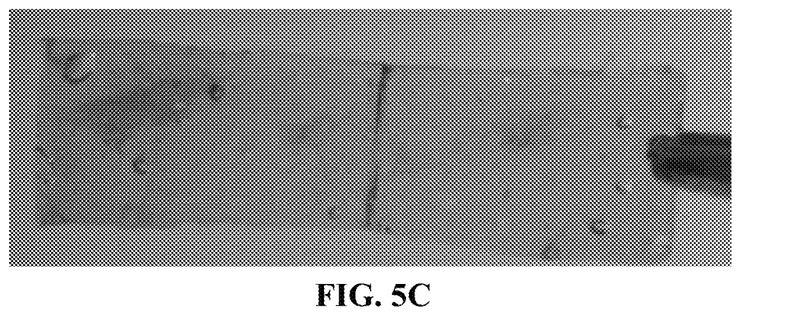
FIG. 5C shows that the two sections of the sample merge for preliminary healing.
Figure 5D:
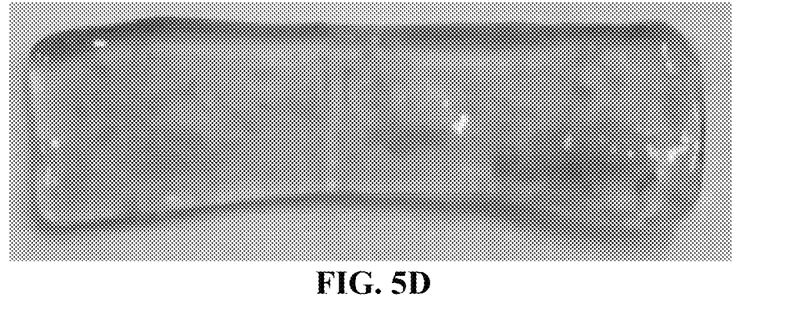
FIG. 5D shows completely healed two sections after drying.
Figure 5E:
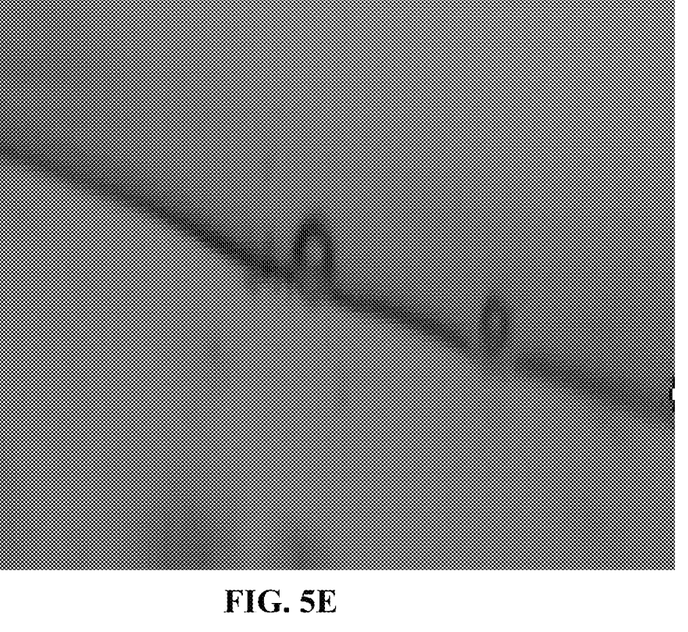
FIG. 5E is an microscope picture showing an interface after the preliminary healing.
Figure 5F:
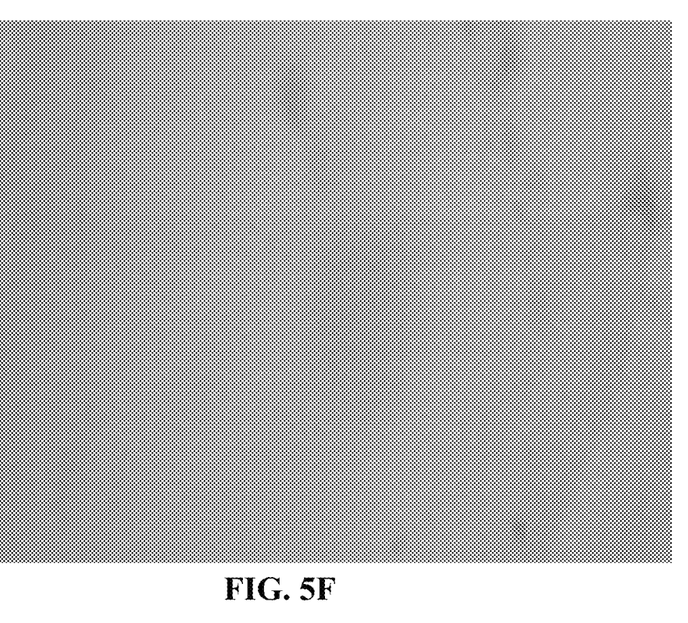
FIG. 5F is an microscope picture showing an interface after complete healing.

The self-healing performance of the prepared amphoteric shape-memory polyurethane is illustrated in FIGS. 5A-5F. In FIG. 5A shows an original shape of the amphoteric shape-memory polyurethane. The original amphoteric shape-memory polyurethane is cut into two parts, which are shown in FIG. 5B. Incisions of the two parts of the amphoteric shape-memory polyurethane are placed close to each other; and after a period of time, incisions begins to merge together, as shown in FIG. 5C and FIG. 5E. Finally, the incisions are completely healed, as shown in FIG. 5D and FIG. 5F.

EXAMPLE 4

1) In the presence of nitrogen gas, 34.5 g of hexamethylene diisocyanate, 8 g of N-methyldimethanolamine, 0.02 wt. % of dibutyl tin dilaurate as a catalyst, and 200 mL of N, N-dimethylacetamide were respectively added to a three-mouth flask. A temperature was raised to 70° C. to carry out reaction for 3 hrs. Then 9 g of 1,4-ethanediol was added to the three-mouth flask for further reaction for 3 hrs. The viscosity of a resulting polyurethane prepolymer solution was regulated to 10 percent by weight. 2) 1,4-butane sultone of calculated dosages were respectively added to 30 g of the polyurethane prepolymer solution having a concentration of 10 percent by weight according to molar ratios of 1,4-butane sultone to N-methyldimethanolamine of 0.0, 0.2, 0.4, 0.5, 0.6, 0.8 to conduct ring-opening reaction at 50° C. for 12 hrs in a sealed flask. Resulting mixed solutions comprising polyurethane and N, N-dimethylacetamide were poured into modules, dried in the blast oven at 80° C. for 24 hrs and then in the vacuum oven at 80° C. for 24 hrs to yield membrane materials of the amphoteric shape-memory polyurethanes, samples of which were respectively labeled as ZSMPU0, ZSMPU2, ZSMPU4, ZSMPU5, ZSMPU6, and ZSMPU8.

Figure 6:
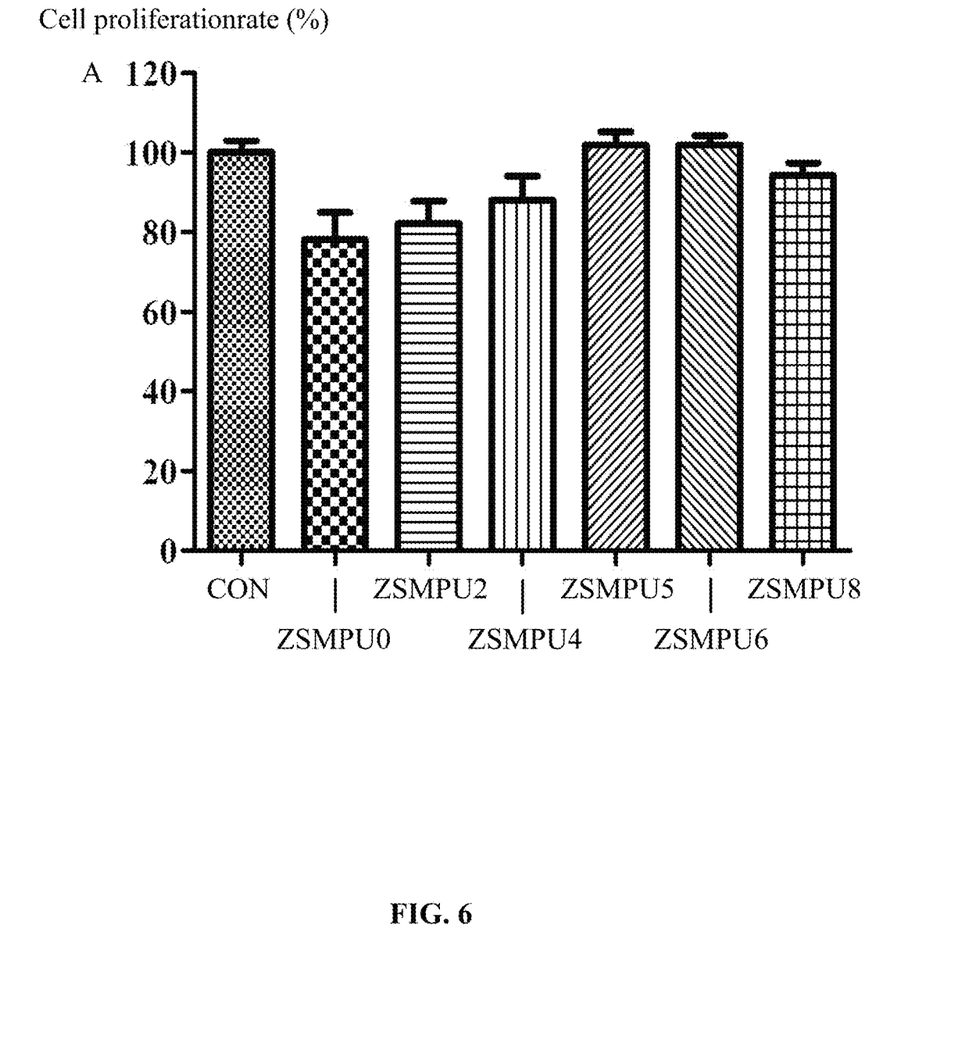
FIG. 6 illustrates test results of cell activities of amphoteric shape-memory polyurethanes prepared in Example 4.

Samples of the prepared amphoteric shape-memory polyurethanes were incubated together with macrophages (RAW264.7), and cell activities were tested using a cell counting kit-8, results of which are shown in FIG. 6. It is known from FIG. 6 that the cell activity of the macrophages not treated by the polyurethane in the blank control group is 100%; the cell activities of the macrophages in the groups of amphoteric shape-memory polyurethane treated by 1,3-propane sultone are between 78.4% and 101.8%. With the increment in the dosage of the 1,3-propane sultone, the cell activity increases. These results demonstrated that the amphoteric shape-memory polyurethanes have relatively good biocompatibility.

EXAMPLE 5

1) In the presence of nitrogen gas, 45 g isophorone diisocyanate, 8 g N-methyldimethanolamine, 0.02 wt. % of dibutyl tin dilaurate as a catalyst, and 200 mL of N, N-dimethylacetamide were respectively added to a three-mouth flask. A temperature was raised to 70° C. to carry out reaction for 5 hrs. The viscosity of a resulting polyurethane prepolymer solution was regulated to 10 percent by weight. 2) 1,3-propane sultone of calculated dosages were respectively added to 30 g of the polyurethane prepolymer solution having a concentration of 10 percent by weight according to molar ratios of 1,3-propane sultone to N-methyldimethanolamine of 0.0, 0.2, 0.4, 0.5, 0.6, 0.8 to conduct ring-opening reaction at 50° C. for 12 hrs in a sealed flask. Resulting mixed solutions comprising polyurethane and N, N-dimethylacetamide were poured into modules, dried in the blast oven at 80° C. for 24 hrs and then in the vacuum oven at 80° C. for 24 hrs to yield membrane materials of the amphoteric shape-memory polyurethanes, samples of which were respectively labeled as ZSMPU0, ZSMPU2, ZSMPU4, ZSMPU5, ZSMPU6, and ZSMPU8.

Figure 7:
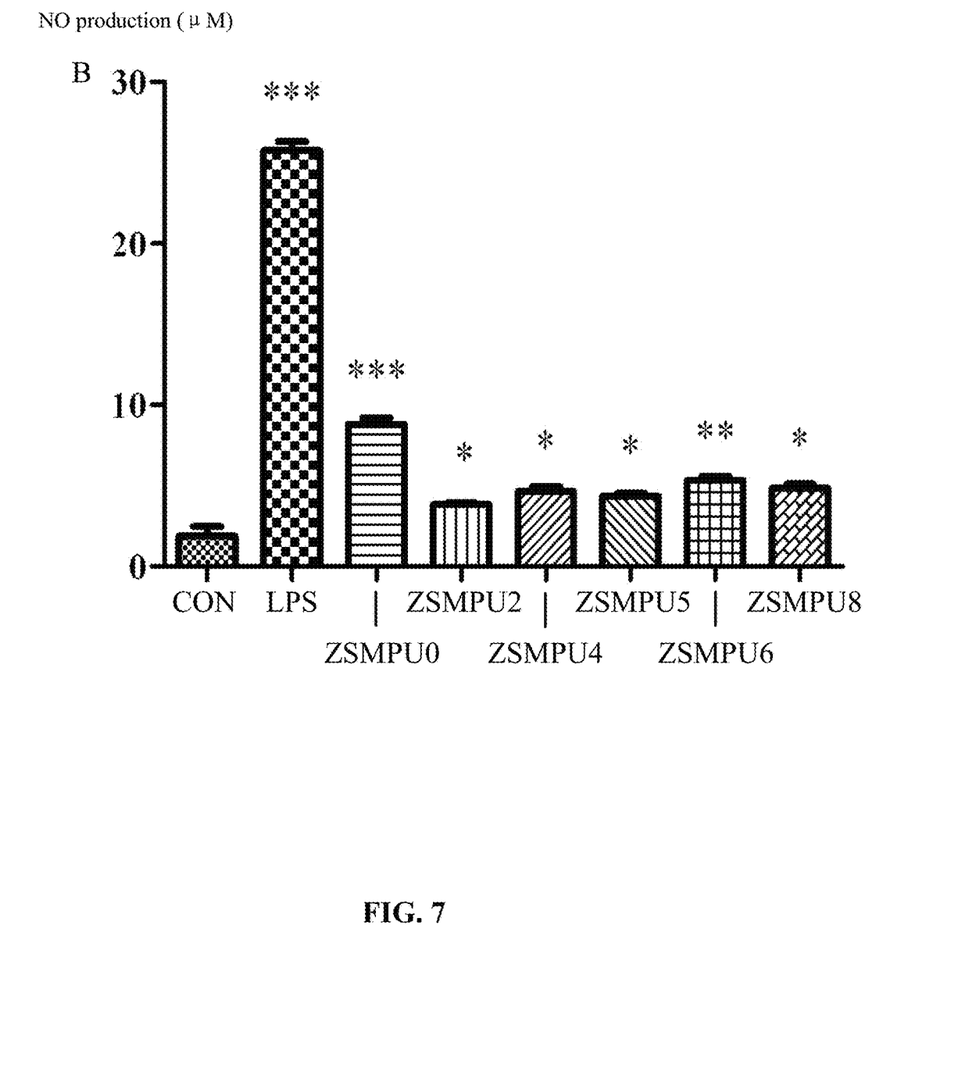
FIG. 7 illustrates test results of produced amount of free radicals NO after incubation of amphoteric shape-memory polyurethanes together with macrophages (RAW264.7) in Example 5.

Samples of the prepared amphoteric shape-memory polyurethanes were respectively incubated together with macrophages (RAW264.7). In addition, pure macrophages (RAW264.7) were incubated as a blank control group, and macrophages (RAW264.7) added with a lipopolysaccharide as bacterial endotoxin were incubated as a positive control group. Formations of free radicals NO of different groups were illustrated in FIG. 7. It is indicated in the figure that the amount of the produced free radicals NO in the polymer groups is between the blank control group and the positive control group, which indicates that the amphoteric shape-memory polyurethanes possess relatively good biocompatibility.

EXAMPLE 6

1) In the presence of nitrogen gas, 34.5 g of hexamethylene diisocyanate, 20 g of N-methyldiethanolamine, 0.02 wt. % of dibutyl tin dilaurate as a catalyst, and 200 mL of N, N-dimethylacetamide were respectively added to a three-mouth flask. A temperature was raised to 80° C. to carry out reaction for 4 hrs. The viscosity of a resulting polyurethane prepolymer solution was regulated to 10 percent by weight. A resulting mixed solution comprising polyurethane and N, N-dimethylacetamide was poured into a module, dried in the blast oven at 80° C. for 24 hrs and then in the vacuum oven at 80° C. for 24 hrs to yield a polymer not treated by 1,3-propane sultone, from which a sample labeled as ZSMPU0 was collected.

2) 0.60 g of 1,3-propane sultone was added to 30 g of the polyurethane prepolymer solution having a concentration of 10 percent by weight according to a molar ratio of 1,3-propane sultone to N-methyldiethanolamine of 0.8 (r=0.8) to conduct ring-opening reaction at 50° C. for 12 hrs in a sealed flask. A resulting mixed solution comprising polyurethane and N, N-dimethylacetamide was poured into a module, dried in the blast oven at 80° C. for 24 hrs and then in the vacuum oven at 80° C. for 24 hrs to yield a membrane material of the amphoteric shape-memory polyurethane, from which a sample labeled as ZSMPU8 was collected.

Figure 8:
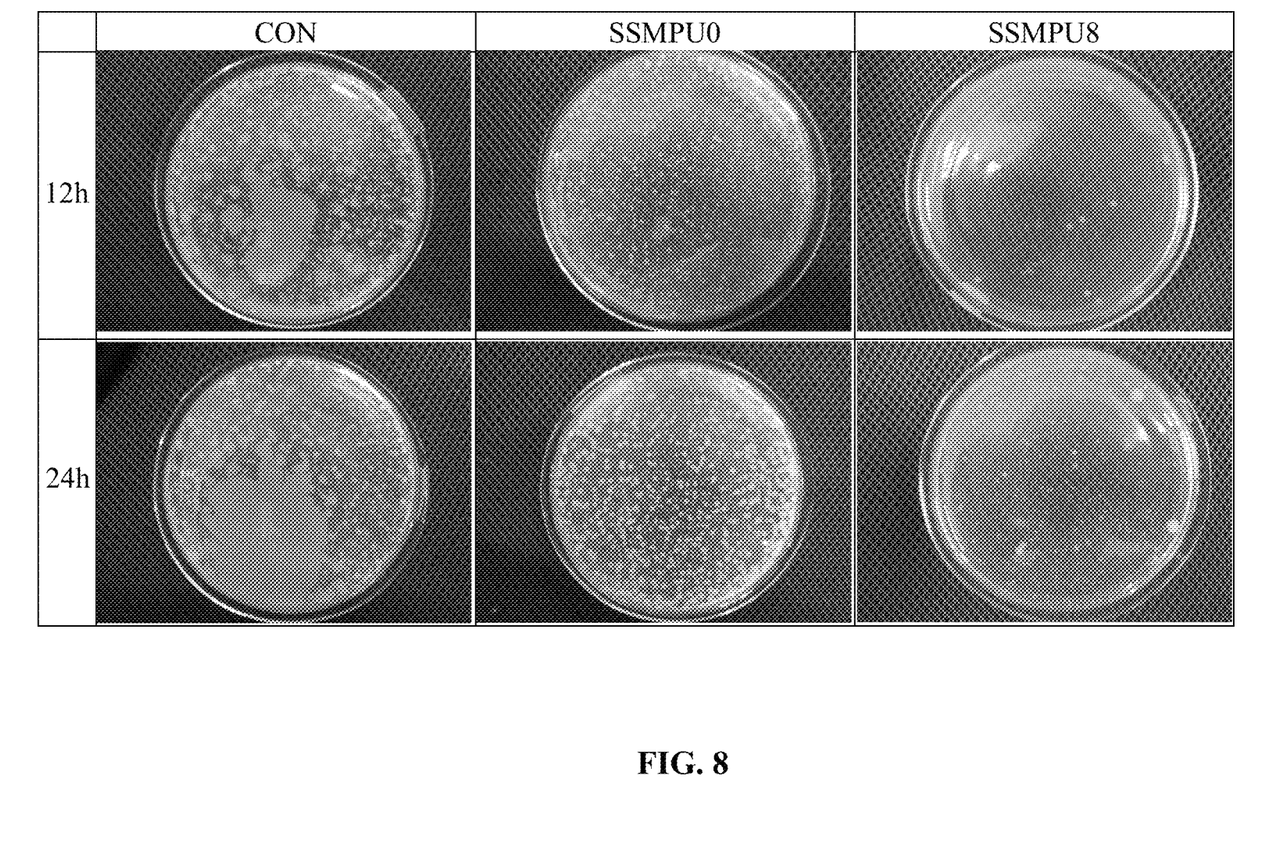
FIG. 8 illustrates test results of antibacterial performances of amphoteric shape-memory polyurethanes prepared in Example 6.

The amphoteric shape-memory polyurethane (ZSMPU8) and the polymer (ZSMPU0) not treated by 1,3-propane sultone were treated by a membrane adhering method to test the antibacterial performance, and a group in the absence of the polyurethane served as a blank control group, results were illustrated in FIG. 8. It is demonstrated that the amphoteric shape-memory polyurethane has good antibacterial performance, and the polyurethane not treated with 1,3-propane sultone has poor antibacterial performance It is known from the above embodiments that the amphoteric shape-memory polyurethane prepared by the method of the invention has thermally induced shape-memory effect, as well as antibacterial performance, biocompatibility, and self-healing performance The amphoteric shape-memory polyurethane has great application prospect in engineering, architecture, daily life, energy materials, and biomedical materials.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing an amphoteric shape-memory polyurethane, comprising:
   1) polymerizing monomer A and monomer B to synthesize a polyurethane; and
   2) contacting monomer D and the polyurethane to conduct a ring-opening reaction on a nitrogen group of the polyurethane, to synthesize an amphoteric shape-memory polyurethane;
wherein
   the monomer A is a N-alkyl dialkanolamine having a formula I:

I in which,

R represents —$C_nH_m$, n is an integer between 1 and 18, m ≤2n +1,

R' represents $C_xH_{2x}$, and x is an integer between 1 and 5;

the monomer B is a polyisocyanate; and the monomer D is an alkyl sultone;

wherein in 1), following the polymerization of the monomer A and the monomer B, monomer C is added, and the monomer C is a polyhydric alcohol.

2. The method of claim 1, wherein:

a dosage of the monomer A and a dosage of the monomer C satisfy the following relation: a molar ratio q =[C]/([C] +[A]) involving a molar number [A] of the monomer A and a molar number [C] of the monomer C is between 0 and 0.5;

the dosage of the monomer A, a dosage of the monomer B, and the dosage of the monomer C satisfy that a molar ratio r =[NCO]/[OH] involving a molar number [OH] of a hydroxyl group in the monomer A or a sum of hydroxyl groups in the monomer A and the monomer C and a molar number of [NCO] of an isocyanate group of the monomer B is between 0.95 and 1.05; and a dosage of the monomer D satisfies that a molar ratio p =[D]/[A] involving the molar number [A] of the monomer A and a molar number [D] of the monomer D is between 0.2 and 1.2.

3. The method of claim 1, wherein in 1), synthesis of the polyurethane comprises: stirring the monomer A, the monomer B, an organic solvent, and dibutyl tin dilaurate as a catalyst in the presence of nitrogen gas for reaction at a temperature of between 70 and 90° C. for between 2 and 5 hrs; adding the monomer C to a resulting mixture for further reaction for between 2 and 5 hrs to yield a polyurethane prepolymer solution; and adding the organic solvent to the polyurethane prepolymer solution to adjusting a weight concentration of the polyurethane prepolymer solution to account for between 10 and 30 percent by weight of a total weight of a resulting mixed solution.

4. The method of claim 3, wherein in 2), synthesis of the amphoteric shape-memory polyurethane comprises: mixing the polyurethane prepolymer solution, the monomer D, and the organic solvent in the presence of nitrogen gas to yield a mixed solution, controlling a weight concentration of the mixed solution to be between 5 and 20 percent by weight; sealing the mixed solution for reaction at a temperature of between 30 and 50° C. for between 8 and 24 hrs to yield a solution comprising the amphoteric shape-memory polyurethane.

5. The method of claim 4, further comprising: evaporating the organic solvent from the solution comprising the amphoteric shape-memory polyurethane at a temperature of between 80 and 100° C.

6. The method of claim 5, wherein the solution comprising the amphoteric shape-memory polyurethane is dried in a blast oven and a vacuum oven at the temperature of between 80 and 100° C. respectively to evaporate the organic solvent.

7. The method of claim 3, wherein:

the organic solvent is N, N-dimethylformamide, N, N-dimethylacetamide, or tetrahydrofuran;

the monomer B is an aliphatic polyisocyanate acid or an aromatic polyisocyanate acid; and the monomer C is a dihydric alcohol, a trihydric alcohol, or a tetrahydric alcohol.

8. The method of claim 4, wherein:

the organic solvent is N, N-dimethylformamide, N, N-dimethylacetamide, or tetrahydrofuran;

the monomer B is an aliphatic polyisocyanate acid or an aromatic polyisocyanate acid; and the monomer C is a dihydric alcohol, a trihydric alcohol, or a tetrahydric alcohol.

9. The method of claim 1, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

10. The method of claim 2, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

11. The method of claim 3, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

12. The method of claim 4, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

13. The method of claim 5, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

14. The method of claim 6, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and the monomer D is 1,3-propanesultone or 1,4-butane sultone.

15. The method of claim 7, wherein:

the N-alkyl dialkanolamine is N-methyldiethanolamine, N-octadecyldiethanolamine, or N-methyldimethanolamine;

the monomer B is hexamethylene diisocyanate, diphenylmethane diisocyanate, or isophorone diisocyanate;

the monomer C is 1,4-butanediol or 1,4-ethanediol; and
the monomer D is 1,3-propanesultone or 1,4-butane sultone.

16. The method of claim 8, wherein:
the N-alkyl dialkanolamine is N-methyldiethanolamine, N-octadecyldiethanolamine, or N-methyldimethanolamine;
the monomer B is hexamethylene diisocyanate, diphenylmethane diisocyanate, or isophorone diisocyanate;
the monomer C is 1,4-butanediol or 1,4-ethanediol; and
the monomer D is 1,3-propanesultone or 1,4-butane sultone.

17. An amphoteric shape-memory polyurethane prepared by the method of claim 1.

\* \* \* \* \*